(12) United States Patent
Symington et al.

(10) Patent No.: US 11,174,976 B2
(45) Date of Patent: Nov. 16, 2021

(54) MAGNETIC PATCH SYSTEM (71) Applicant: ULC ROBOTICS, INC., Hauppauge, NY (US)

(72) Inventors: Alex Symington, Middle Island, NY (US); David Meck, Patchogue, NY (US); Aalap Rajendra Shah, Westbury, NY (US)

(73) Assignee: ULC Robotics, Inc., Hauppauge, NY (US)

(*) Notice: Subject to any disclaimer, the term of this patent is extended or adjusted under 35 U.S.C. 154(b) by 10 days.

(21) Appl. No.: 16/802,906

(22) Filed: Feb. 27, 2020

(65) Prior Publication Data

US 2020/0278067 A1   Sep. 3, 2020

Related U.S. Application Data

(60) Provisional application No. 62/811,809, filed on Feb. 28, 2019.

(51) Int. Cl.
*F16L 55/162* (2006.01)
*F16L 55/18* (2006.01)
*F16L 55/168* (2006.01)

(52) U.S. Cl.
CPC ......... *F16L 55/162* (2013.01); *F16L 55/1683* (2013.01); *F16L 55/18* (2013.01)

(58) Field of Classification Search
CPC ..... F16L 55/162; F16L 55/1683; F16L 55/18; F16J 15/00

USPC ............................................. 138/98, 99, 97
See application file for complete search history.

(56) References Cited

U.S. PATENT DOCUMENTS

| | | | | |
|---|---|---|---|---|
| 5,735,227 A | * | 4/1998 | Goulding | B63B 43/16 114/227 |
| 2013/0133770 A1 | * | 5/2013 | Wood | F16L 55/18 138/97 |
| 2019/0224932 A1 | * | 7/2019 | Kirmer | E04G 23/0203 |

FOREIGN PATENT DOCUMENTS

| | | |
|---|---|---|
| DE | 202012104362 U1 | 11/2012 |
| KR | 20170034744 A | 3/2017 |
| RU | 2481224 C1 | 5/2013 |
| WO | 9607584 A1 | 3/1996 |

* cited by examiner

*Primary Examiner* — Patrick F Brinson
(74) *Attorney, Agent, or Firm* — Brooks Kushman P.C.

(57) ABSTRACT

A magnetic patch system includes a sealing member configured for attachment to a pipeline proximate to a breach in a wall of the pipeline. A magnet is positioned at least partially within a housing arrangement. The magnet may be oriented to generate a force toward the wall of the pipeline to attach the housing arrangement to the wall of the pipeline and capture the sealing member between the housing arrangement and the wall of the pipeline. The system may be installed inside a pipeline using a remotely controlled robotic system.

17 Claims, 5 Drawing Sheets

MAGNETIC PATCH SYSTEM

CROSS-REFERENCE TO RELATED APPLICATIONS

This application claims the benefit of U.S. provisional application Ser. No. 62/811,809 filed Feb. 28, 2019, the disclosure of which is hereby incorporated in its entirety by reference herein.

STATEMENT REGARDING FEDERALLY SPONSORED RESEARCH OR DEVELOPMENT

This invention was made with Government support under Contract No. DE-SC0018906 awarded by the U.S. Department of Energy. The Government has certain rights in this invention.

TECHNICAL FIELD

The present disclosure relates to a magnetic patch system.

BACKGROUND

Many underground pipelines—including gas, water, and sewer pipelines—are made from metal alloys and are subject to corrosion. Although preventative measures such as using a sacrificial anode attached to the pipeline can be effective to reduce or eliminate corrosion, the pipeline may still experience degradation over time. And there are many pipelines that do not have the benefit of preventative, corrosion-reducing systems. There are also other metallic structures that are subject to breaches and require an effective mechanism for patching the breach. Some structures may be difficult to access, and for a conventional repair, may require time-consuming, expensive excavation. Therefore, a need exists for a magnetic patch system that overcomes limitations of conventional repair systems and provides an effective way to repair a breach in a metallic structure.

SUMMARY

Embodiments described herein may include a magnetic patch system that includes a sealing member configured for attachment to a metal structure proximate to a breach in the metal structure. The system may also include a housing arrangement and at least one magnet positioned at least partially within the housing arrangement. The magnet or magnets may be oriented to generate a force toward a wall of the metal structure to attach the housing arrangement to the wall and capture the sealing member between the housing arrangement and the wall of the metal structure.

Embodiments may also include a housing arrangement that has a first portion positioned adjacent the sealing member such that the first portion applies a force to the sealing member when the magnet or magnets attach the housing to the wall of the metal structure. The first portion may be movable toward and away from the wall when the housing arrangement is attached to the pipeline.

Embodiments may further include a housing arrangement that has a biasing member positioned to bias the first portion toward the wall of the metal structure when the housing arrangement is attached to the wall. The housing arrangement may also include outer and inner housing portions having the magnet or magnets positioned therebetween. The outer and inner housing portions may be cylindrical, having more than one of the magnets positioned around at least a portion of a circumference of the housing portions.

Embodiments described herein may include a magnetic patch system having a housing arrangement including a first housing portion and a second housing portion disposed at least partially within the first housing portion and movable relative to the first housing portion between a disengaged position and an engaged position. A magnet arrangement may be at least partially disposed within the housing arrangement and configured to urge the housing arrangement toward a metal structure such that the second housing portion moves from the disengaged position to the engaged position. A biasing arrangement may be at least partially disposed within the housing arrangement, and at least a portion of the biasing arrangement may be configured to urge the second housing portion toward the engaged position.

Embodiments described herein may include a magnetic patch system having a housing arrangement including a first housing portion and a second housing portion disposed at least partially within the first housing portion and movable relative to the first housing portion in a first direction between a first position and a second position. A magnet arrangement may be at least partially disposed within the housing arrangement and configured to urge the housing arrangement toward a metal structure in the first direction. A biasing arrangement may be at least partially disposed within the housing arrangement and configured to apply a force to the housing arrangement in the first direction.

Embodiments described herein may include a magnetic patch system having a first housing portion and a second housing portion movable relative to each other along a path. A magnet arrangement may be at least partially disposed in one of the first housing portion or the second housing portion and configured to attract a metal structure along the path in a first direction. A biasing arrangement may be configured to urge one of the first housing portion or the second housing portion along the path.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
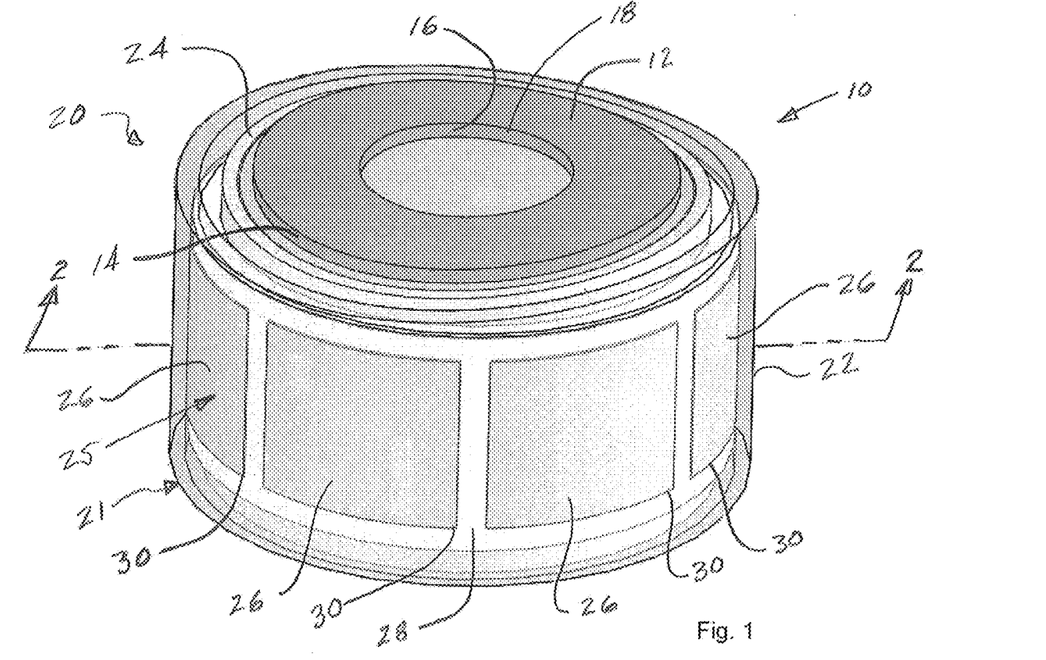
FIG. 1 shows a magnetic patch system in accordance with embodiments described herein.

FIG. 1 shows a magnetic patch system 10 in accordance with embodiments described herein. The system 10 includes a sealing member 12, which is generally circular and includes an outer edge 14 and an inner edge 16 positioned within an opening 18 in the center of the sealing member 12. In other embodiments a sealing member, such as the sealing member 12, may have, for example, an elliptical or other non-circular configuration. As described in more detail below, the sealing member 12 is configured to be forced against a wall of a metal structure such as a pipeline where a hole or other breach has occurred in the wall. As used herein, a "hole" or "breach" can generally be used interchangeably, although a hole may sometimes be considered to have a reasonably regular or uniform geometry; in contrast, many openings in a metal structure caused by corrosion or other degradation can be very irregular in size and shape, and therefore may be more generically referred to as a breach.

The system 10 also includes a housing arrangement 20 that has a first housing portion 21 with an outer portion 22 and an inner portion 24. Positioned between the outer and inner portions 22, 24 is a magnet arrangement 25. The magnet arrangement 25 includes a plurality of magnets 26, not all of which are visible in FIG. 1. In the embodiment shown in FIG. 1, the outer and inner portions 22, 24 are generally cylindrical and the magnets 26 are disposed in a circumferential arrangement around a circumference of the outer and inner portions 22, 24. In the embodiment shown in FIG. 1, the circumferential arrangement is generally circular; however, other embodiments may include magnets disposed in a circumferential arrangement that is not circular—e.g., polygonal with straight or generally straight sides. The magnets 26 have a generally rectangular aspect when viewed from their respective fronts, but as shown more clearly in FIG. 3, the magnets 26 are arcuate when viewed from their respective ends. Also positioned between the housing portions 22, 24 is a retainer 28. The retainer 28 is also cylindrical and in this embodiment is configured with openings 30 that are sized and shaped to receive and retain the magnets 26. The retainer 28 may be made from any material effective to hold the magnets 26 in place and to not adversely affect the magnetic fields they generate, for example, the retainer 28 may be made from a molded polymer.

Figure 2:
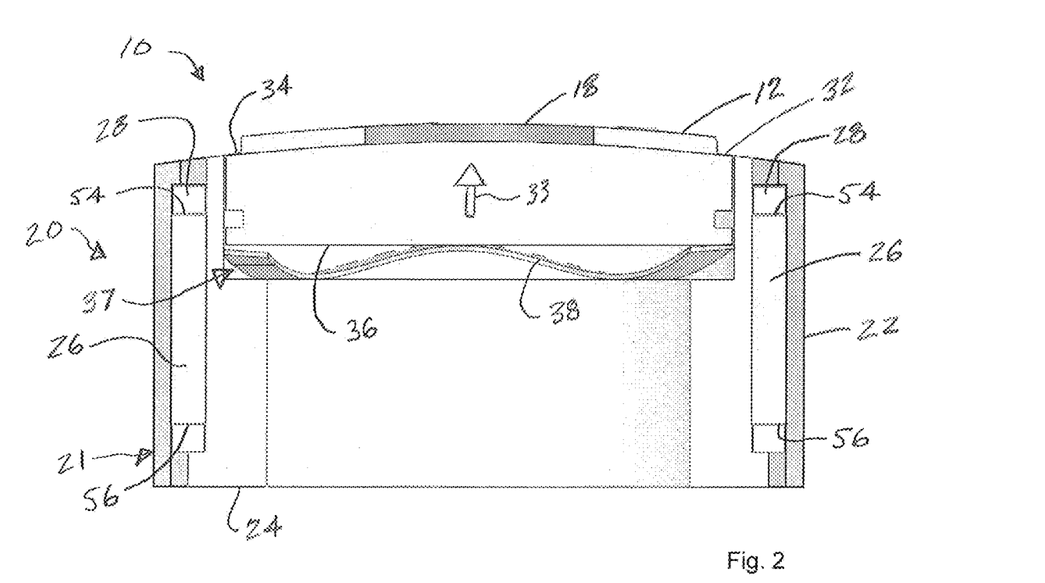
FIG. 2 shows a cross-sectional view of the system shown in FIG. 1.

FIG. 2 shows a cross section of the system 10 taken through the line 2-2 shown in FIG. 1. In addition to the features illustrated in FIG. 1, FIG. 2 shows that the housing arrangement 20 also includes a second housing portion 32 disposed at least partially within the first housing portion 21. In this embodiment, the second housing portion 32 is configured as a piston and is movable relative to the first housing portion 21 in a first direction indicated by the direction arrow 33. As explained in more detail below, the second housing portion 32 is movable in the first direction between a disengaged position and an engaged position; therefore, in this embodiment, the first direction coincides with a direction of engagement. As oriented in FIG. 2, the second housing portion is movable along a path upward and downward relative to the first housing portion 21, although the system 10 may be used in applications where its orientation, and thus the orientation of the path, is different from that shown in FIGS. 1 and 2.

The second housing portion 32 has an outer surface 34 that is in contact with the sealing member 12, and an inner surface 36 positioned opposite the outer surface 34. Also shown in FIG. 2 is a biasing arrangement 37, which includes a biasing member 38. In this embodiment, the biasing member 38 is configured as an annular spring. The spring 38 is positioned between the inner portion 24 of the first housing portion 21 and the inner surface 36 of the second housing portion 32. As explained in more detail in conjunction with FIG. 4, the spring 38 is configured to bias the second housing portion 32 toward a wall of a metal structure such as a pipeline when the housing arrangement 20 is attached to the wall of the pipeline. Specifically, the biasing arrangement 37 is configured to urge the second housing portion 32 toward the engaged position.

Figure 3:
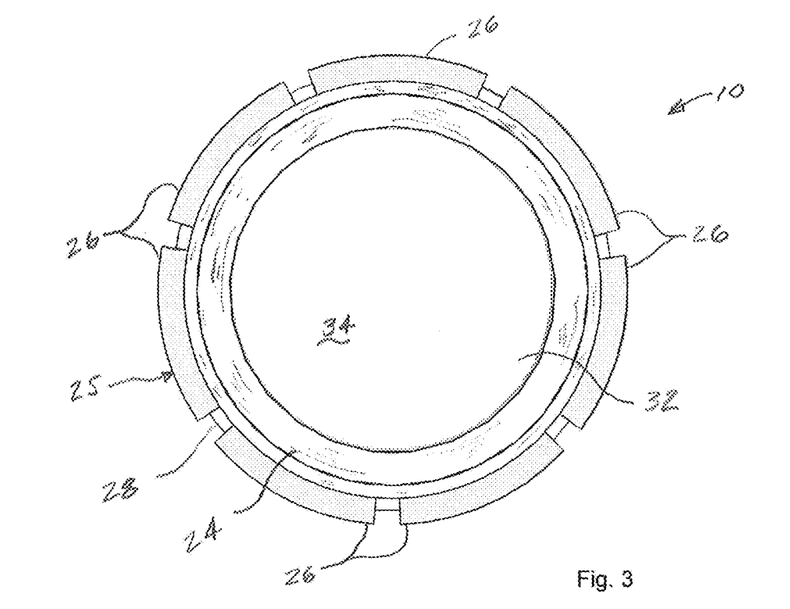
FIG. 3 shows a top view of a portion of the system shown in FIG. 1.

FIG. 3 shows a top view of the system 10 with the outer housing 22 and the sealing member 12 removed. As shown in FIG. 3, the magnets 26 are generally arcuate when viewed from their respective ends. The cylindrical configuration of the housing arrangement 20 and the arcuate shape of the magnets 26 represent one possible configuration for a system such as the system 10. In other embodiments, a housing arrangement may have, for example, an elliptical, polygonal, or other non-circular configuration, and magnets may have other shapes to accommodate the housing and apply a desired force to a wall of the pipeline. In the embodiment shown in FIG. 3, the system 10 includes seven of the magnets 26, although in other embodiments a greater number of magnets, or fewer magnets, may be used.

Figure 4:
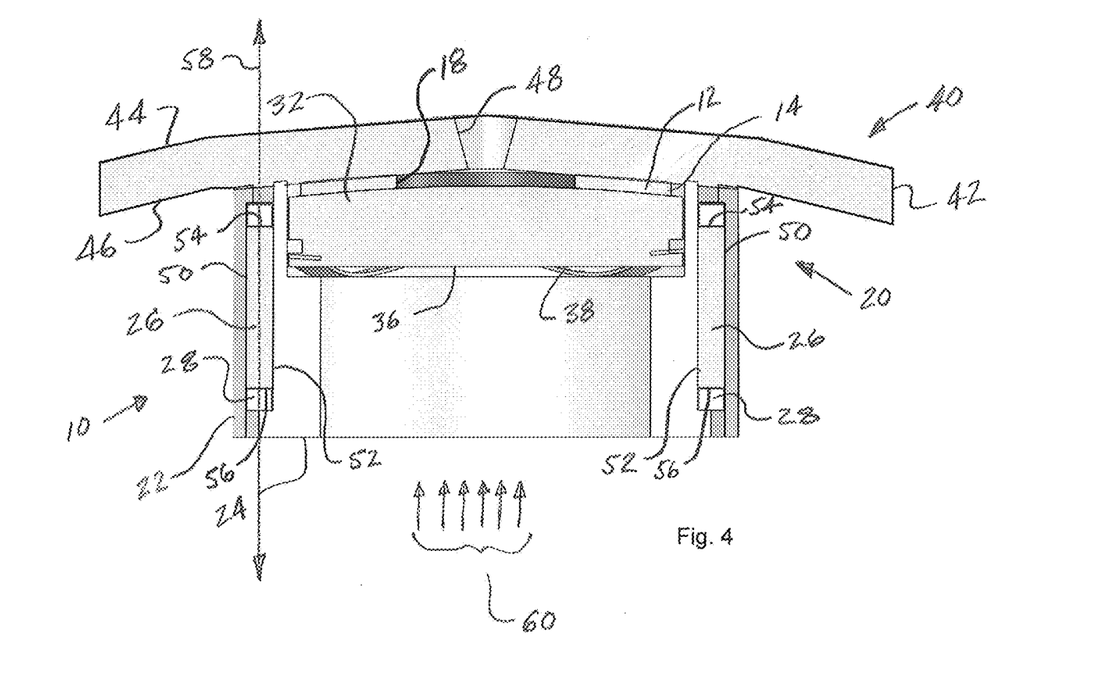
FIG. 4 shows a cross-sectional view of the system shown in FIG. 1 installed in a pipeline.

FIG. 4 shows a cross-sectional view of the system 10 attached to a pipeline 40. The pipeline 40 includes a pipeline wall 42 having an outside surface 44 and an inside surface 46. As shown in FIG. 4, the pipeline wall 42 is breached by an irregularly-shaped hole 48, which traverses the entire thickness of the pipeline wall 42, from the outside surface 44 to the inside surface 46. The housing arrangement 20 is attached to the inside surface 46 of the pipeline wall 42. Although the housing arrangement 20, and in particular the outer and inner portions 22, 24, may be made from any material effective to achieve the desired purpose, the system 10 may be particularly effective when the outer and inner portions 22, 24 are made from metallic materials that are subject to magnetic forces—e.g., ferrous alloys. For the magnets 26, the outer portion 22 may be considered a first metal cover and the inner portion 24 may be considered a second metal cover, and when the metal covers are made from a ferrous alloy, depending on their configuration, they may help to concentrate the magnetic field generated by the magnets 26. In the configuration shown in FIG. 4, the outer and inner portions 22, 24 help to concentrate the magnetic field generated by the magnets 26 toward the inside surface 46 of the pipeline wall 42—i.e., in the direction of engagement.

The magnets 26 are magnetized such that their respective north and south poles are radially located. For example, the north poles of the magnets 26 may be on an outer surface 50, while the south poles of the magnets 26 may be on an inner surface 52. In the embodiment shown in FIG. 4, each of the magnets 26 includes a first end 54 and a second end 56, which is opposite the first end 54. The first end 54 and the second end 56 define a line—see, e.g., the line 58—that is parallel to the path and parallel to the direction of engagement. This is just one possible configuration for a system such as the system 10, and there may be many considerations as to the most desirable way to orient the magnets, including the configuration of the housing and any associated retainer, such as the retainer 28. In some embodiments, magnets, such as the magnets 26, may generate an attachment force of 80 pounds or more, and in some embodiments may generate an attachment force of more than 100 pounds.

As shown FIG. 4, the housing arrangement 20 is attached to the pipeline wall 42 such that the sealing member 12 is captured between the piston 32 and the inside surface 46 of the pipeline wall 42. The piston 32 experiences force in an upward direction as the system 10 as oriented in FIG. 4, which is caused, at least in part, by the spring 38 being compressed between the housing portion 24 and the inner surface 36 of the piston 32. In addition, the inside surface 36 of the piston 32 is also acted upon by the internal pressure of the pipeline 40 as indicated by the directional arrows 60. The internal pressure of the pipeline 40 may be caused by pressurized natural gas or liquid, and in some applications may be 750-1000 pounds per square inch (psi) or higher. In the embodiment shown in FIG. 4, the force generated by the magnets 26 holds the first housing portion 22 to the pipeline wall 42. This causes the sealing member 12 to be compressed against the inside surface 46 of the pipeline wall 42, which deflects the spring 38. Deflection of the spring 38 causes a force to be imparted to the second housing portion 32 in the direction of engagement. The force applied by the spring 38 is enough to create a seal between sealing member 12 and the inside surface 46 of the pipeline wall 42 so that the pressurized gas inside the pipeline 40 does not undesirably circumvent the sealing member 12 around its outer edge 14. As a result, the pressurized gas is able to augment the seal formed between the sealing member 12 and the inside surface 46 of the pipeline wall 42 by acting in the direction of the directional arrows 60.

The sealing member 12 may be made from any material effective to create the desired seal between the housing arrangement 20 and the pipeline wall 42. For example, silicone, nitrile, or neoprene may be effective to produce the desired seal. The choice of material may depend on a number of factors, including the amount of sealing force necessary to create the desired seal, as well as the environment in which the seal material will be used. For example, some applications may expose a sealing member to very hot or very cold temperatures, or both. Other applications may expose a sealing member to chemicals that adversely affect some materials. Because a system, such as the system 10 may be used in many different types of applications, the particular material chosen for the sealing member 12 may vary for different applications. In addition, the thickness of a sealing member, such as the sealing member 12, may vary depending on the application. Although the thickness of the sealing member 12 illustrated in FIG. 4 is generally uniform, in other embodiments, a sealing member may have a thickness that varies along its width, length, or both. In the case of a generally circular sealing member, such as the sealing member 12, the thickness may vary from the outer edge 14 to the inner edge 16.

As shown in FIG. 4, the opening 18 in the sealing member 12 has a diameter several times the diameter of the hole 48 in the pipeline wall 42. Increasing the size of the opening 18 reduces the amount of material in the sealing member 12 that is captured between the piston 32 and the pipeline wall 42. Because of this, the force acting on the piston 32 from the internal pressure of the pipeline 40 and from the magnets 26 and spring 38 acts over a smaller surface area. This in turn increases the sealing pressure applied by the sealing member 12 on the inside surface 46 of the pipeline wall 42, which may form a more effective seal. The ratio between the diameter of the opening in a pipeline wall and a sealing member such as the sealing member 12 may depend on a number of factors, including the internal pressure of the associated pipeline and the force applied by the attachment of the housing arrangement to the pipeline wall.

The system 10 may be installed inside the pipeline 40 using a remotely controlled robotic system that attaches the system 10 to the pipeline wall while the pipeline 40 is still live—i.e., pressurized with gas. This can reduce downtime and the disruption in service that repairs of this kind often require. In other applications, a system such as the system 10 may be attached to the pipeline wall when the pipeline is depressurized. It can be temporarily held in place by the magnet or magnets, and then when the pipeline is re-pressurized, the additional force caused by the internal pipeline pressure further secures the system to the pipeline wall. In addition to using a patch system, such as the system 10, inside a live natural gas pipeline, it may be useful in other applications where access is difficult. Depending on the structure and the breach, a conventional repair may require the breach to be accessible by one or more technicians and large equipment. In these hard-to-reach areas such as under water crossings, bridges, railroads, and roadways, where access is limited and excavation cannot be performed quickly, a robot can be launched remotely and driven to the breach location to install the magnetic patch system. This allows a fast repair of breaches that would otherwise take much longer to repair, or in some cases, could not be repaired at all.

Figure 5:
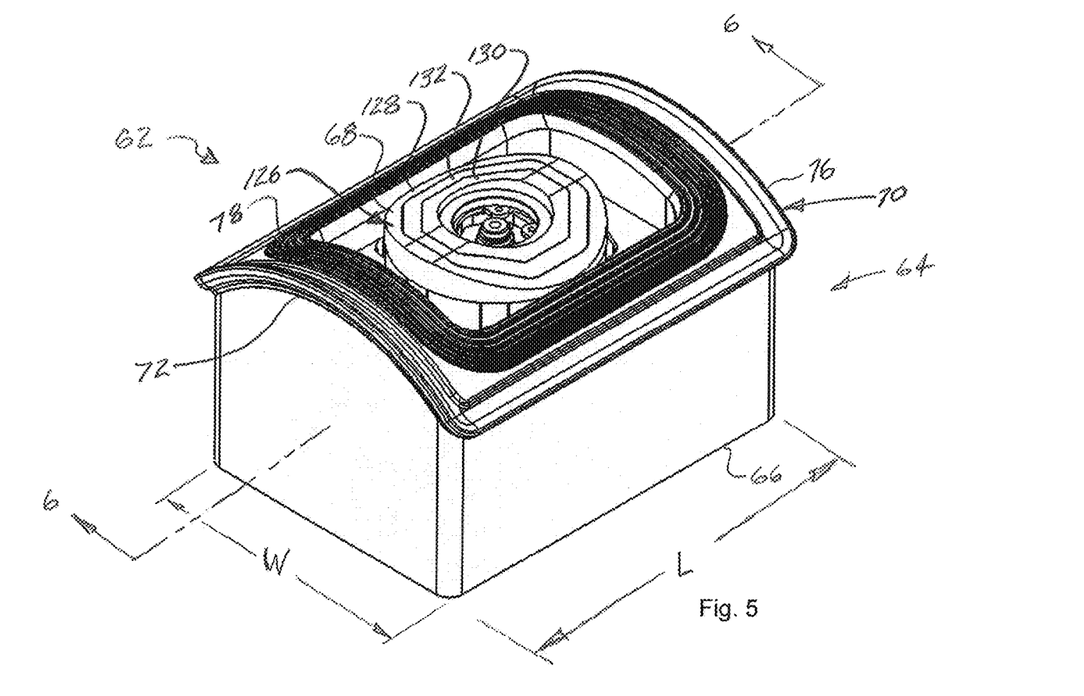
FIG. 5 shows a magnetic patch system in accordance with embodiments described herein.

FIG. 5 shows a magnetic patch system 62 in accordance with embodiments described herein. The system 62 includes a housing arrangement 64, including a first housing portion 66 and a second housing portion 68. The second housing portion 68 is movable relative to the first housing portion 66 along a path, which in the embodiment shown in FIG. 5 is in upward and downward directions. A sealing member 70 is disposed on the first housing portion 66, and as explained in more detail below, helps to seal a breach in a structure, such as a pipeline wall. In the embodiment shown in FIG. 5, the housing arrangement 64 has a length (L) of approximately 3 inches (in.) and a width (W) of approximately 2.5 in. The dimensions of the sealing member 70 may be somewhat less than the overall dimensions of the housing arrangement 64, but this still provides a system operable to patch a relatively large breach in a structure, such as a pipeline wall. As shown in FIG. 5, an upper portion 72 of the system 62 has a generally arcuate aspect when viewed from a side of the housing arrangement 64. This may help the system 62 conform to the inside of a curved surface, such as a pipeline wall. Other embodiments of a system, such as the system 62, can be increased or decreased in size, provided with a different L/W ratio—or even a non-rectangular configuration—or provided with a flat surface at the sealing member 70 to accommodate different structures and breaches of different sizes and shapes.

Figure 6:
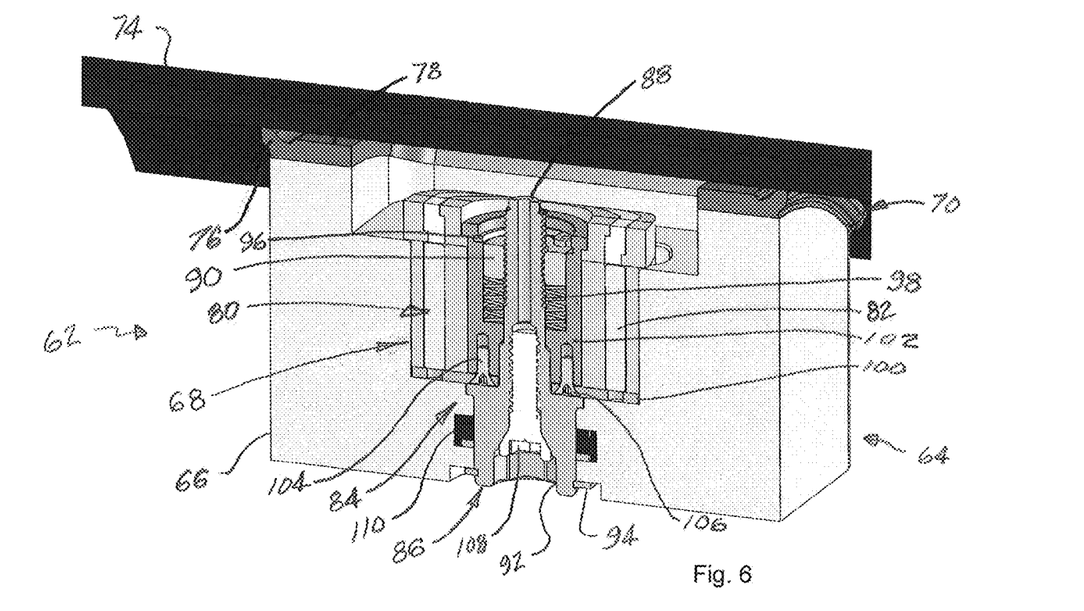
FIG. 6 shows a cross-sectional view of the system shown in FIG. 5 disengaged from a pipeline.

FIG. 6 shows a cross-sectional view of the system 62 taken through the lines 6-6 shown in FIG. 5. In FIG. 6, the system 62 is shown with the sealing member 70 in contact with a pipeline wall 74. As shown in FIG. 6, the sealing member 70 includes an outer lip 76 and an inner sealing surface 78. In at least some embodiments, the outer lip 76 may be made from a softer material than the inner sealing surface 78 to more readily conform to an uneven structure, such as the pipeline wall 74. The system 62 also includes a magnet arrangement 80 that includes a plurality of magnets 82, only one of which is labeled in FIG. 6 for clarity. The magnets 82 are disposed in a circumferential arrangement, and in this embodiment the circumferential arrangement is generally octagonal. The magnet arrangement 80 forms a portion of the second housing portion 68 and is at least partially disposed within the first housing portion 66. As explained in more detail below, the magnet arrangement 80 is configured to urge the housing arrangement 64 toward a metal structure, such as the pipeline wall 74.

Figure 9:
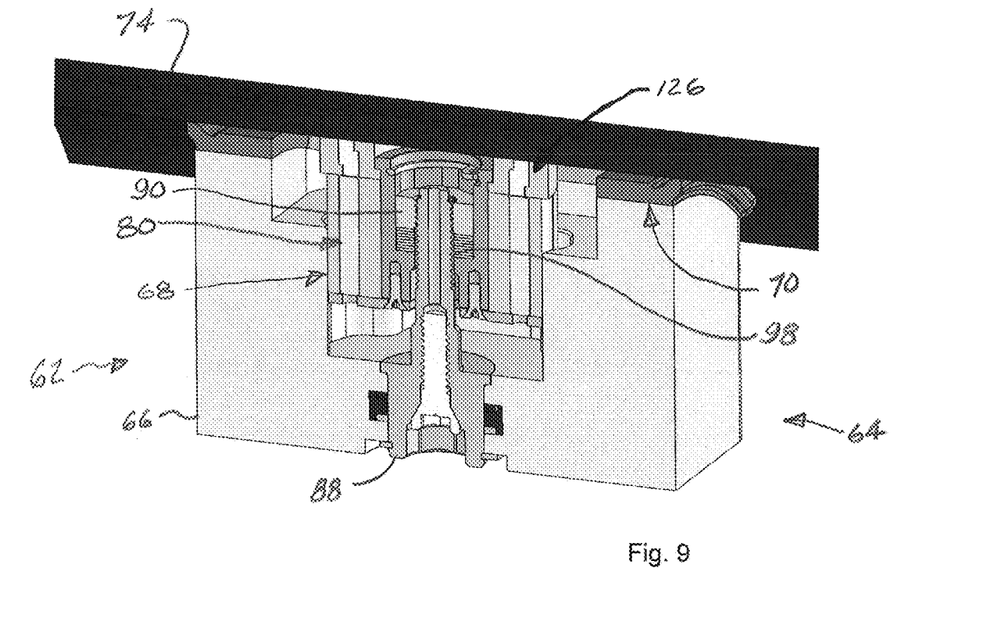
FIG. 9 shows a cross-sectional view of the system shown in FIG. 8 engaged with the pipeline wall and having a biasing member fully compressed.
Figure 10:
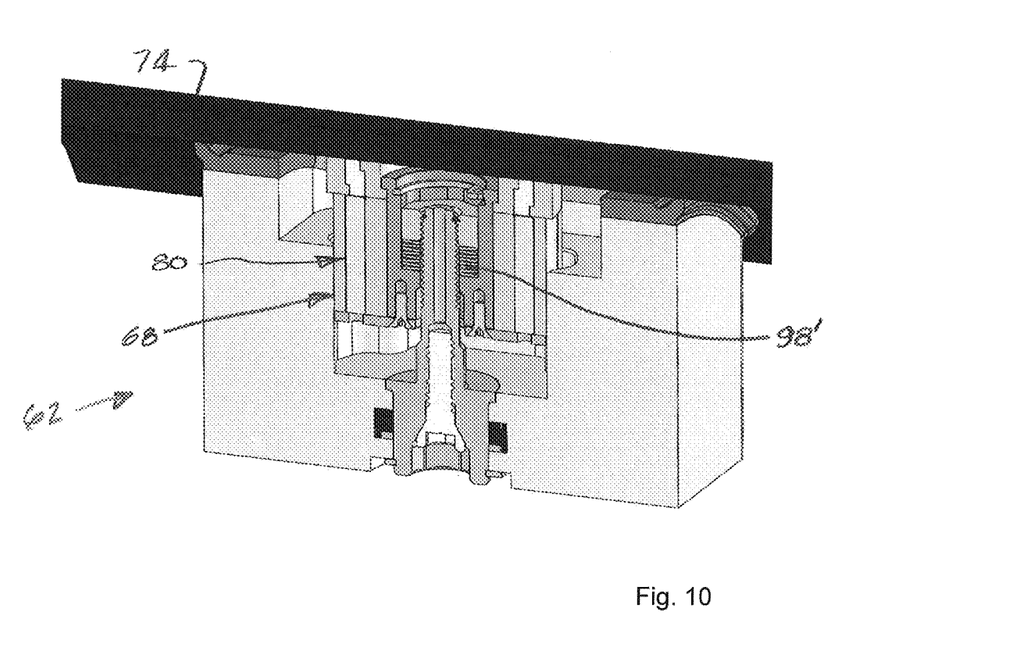
FIG. 10 shows a cross-sectional view of the system shown in FIG. 8 engaged with the pipeline wall and having a biasing member partially compressed.

As shown in FIG. 6, the second housing portion 68 is in a first position, or a disengaged position, wherein it is not contacting the pipeline wall 74. The magnet arrangement 80 is configured to urge the housing arrangement 64, and in particular the second housing portion 68, from the disengaged position shown in FIG. 60 to a second position, or an engaged position, in contact with the pipeline wall 74 as shown in FIGS. 9 and 10. The second housing portion 68 is movable relative to the first housing portion 66 between the first position and the second position in a first direction, which is upward as the system 62 is oriented in FIG. 6. The system 62 also includes a biasing arrangement 84, which is at least partially disposed within the housing arrangement 64. At least a portion of the biasing arrangement 84 is configured to urge the second housing portion 68 toward the engaged position. In the embodiment shown in FIG. 6, the biasing arrangement 84 includes a drive system 86 that is operable to move the second housing portion 68 toward and away from the engaged position. The drive system 86 includes a drive screw 88 that is configured to rotate within a drive nut 90. One end of the drive screw 88 includes a hexagonal socket configured to receive a driveshaft for rotating the drive screw 88. Other embodiments may include different drive systems, such as electric, hydraulic, or pneumatic linear actuators, solenoids, etc. As shown in FIG. 6, the drive screw 88 is held in position relative to the housing arrangement 64 by a retaining ring 94. Similarly, the drive nut 90 is held in position by a retaining ring 96.

In the embodiment shown in FIG. 6, the biasing arrangement 84 also includes a spring member 98, which in this embodiment is a plurality of conical spring washers—e.g., Belleville disc springs. If the spring member 98 is not compressed, it will not apply a force to the nut 90; however, if it is compressed, it will apply a force to the nut 90 in the first direction. As explained in more detail below, the spring member 98 is also configured to resist movement of the second housing portion 68 from the first position as shown in FIG. 6 to the second position as shown, for example, in FIGS. 9 and 10. As shown in FIG. 6, the second housing portion 68 includes a base 100 secured to an inner portion 102 with fasteners 104, 106. Because the drive screw 88 may be manufactured with a through-hole, a plug 108 is provided for applications where the system 62 is used in a pressurized environment, such as a gas pipeline. When the system 62 is removed from the pipeline wall 74, the plug 108 can be removed to allow the internal gas pressure inside the pipeline to pass through the drive screw 88. This reduces the force holding the system 62 to the pipeline wall and makes it easier to remove. To further accommodate use in a pressurized environment, a seal 110, such as an O-ring, is provided between the drive screw 88 and the first housing portion 66.

As described above, the magnets 82 are disposed in a circumferential arrangement similar to the magnets 26 illustrated and described in conjunction with FIGS. 1-4, except that the magnets 82 are disposed in an octagonal arrangement, rather than a circular arrangement. As positioned within the second housing arrangement 68, the magnets 82 have a north pole corresponding to a north face 112 and a south pole corresponding to a south face 114—see FIG. 7. In the embodiment shown in FIGS. 6 and 7, the north face 112 of each of the magnets 82 faces outward away from a center of the circumferential arrangement, while the south face 114 of each of the magnets 82 faces inward toward a center of the circumferential arrangement.

Figure 7:
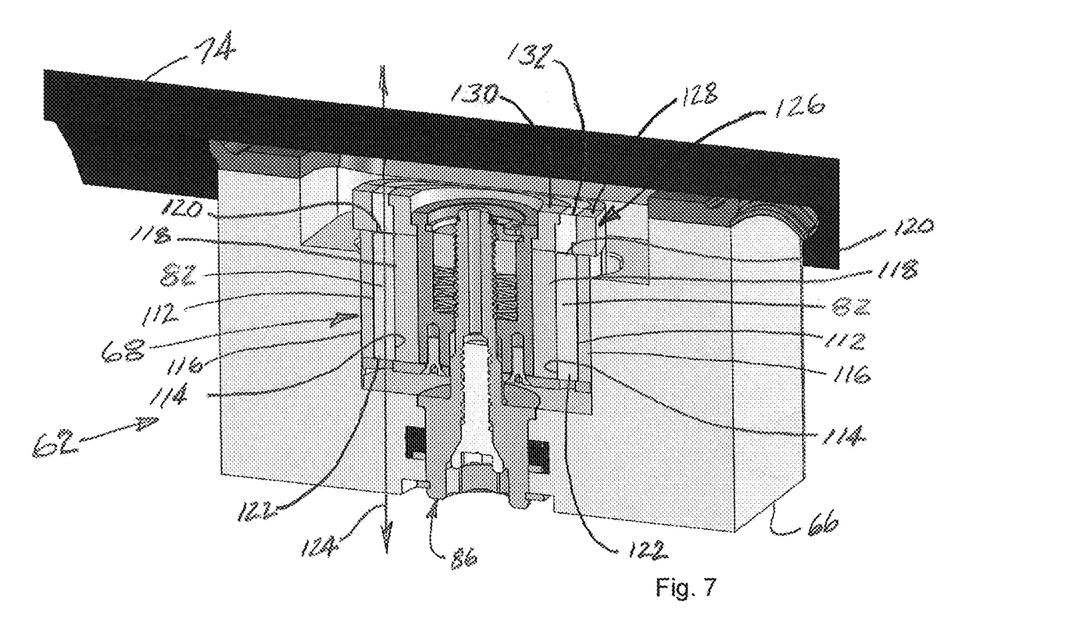
FIG. 7 shows a cross-sectional view of the system shown in FIG. 6 after a portion of a housing has been positioned closer to a wall of the pipeline.

A first metal cover 116 is in contact with the north face 112 of each of the magnets 82 and is positioned on an outside of the circumferential arrangement. A second metal cover 118 is in contact with the south face 114 of each of the magnets and is positioned on an inside of the circumferential arrangement. In this embodiment, the metal covers 116, 118 are made from a ferrous alloy that is subject to magnetic forces. Each of the magnets 82 includes a first end 120 and a second end 122, which define a respective line, such as the line 124, that is parallel to the direction of engagement and along the path of movement of the second housing portion 68 relative to the first housing portion 66.

By surrounding the north and south poles of the magnets 82 with the metal covers 116, 118, the magnetic field generated by each of the magnets 82 is concentrated in a direction along the path—e.g., along a line parallel to the line 124—to more strongly attract a metal structure, such as the pipeline wall 74. Disposed over the first ends 120 of the magnets 82 is a cap 126 that includes first and second metal portions 128, 130 extending from the first and second metal covers 116, 118, respectively. The cap 126 also includes a non-magnetic material 132 positioned directly over the second ends 120 of the magnets 82 and sandwiched between the first and second metal portions 128, 130—see also FIG. 5. The non-magnetic material 132 may be, for example, a plastic or other polymeric material that helps to prevent damage to the magnet arrangement 80 and the metal structure to which it is attached, such as the pipeline wall 74.

When the second housing portion 68 is in the first position, or disengaged position, as shown in FIG. 6, the magnet arrangement 80 is far enough from the upper portion 72 of the housing arrangement 64 that the system 62 will not be magnetically drawn to a metal structure such as the pipeline wall 74. This may be beneficial to allow the system 62 to be properly placed and oriented over a breach before the magnetic attraction makes placement difficult. This may be particularly useful in situations where an automated system, such as a robotic system traversing a live gas pipeline, is used to articulate the system 62 into position. If the magnetic attraction were to occur as soon as the housing arrangement 64 was brought into proximity with the pipeline wall, it could be difficult for the robotic device to optimally place the system 62. In the embodiment illustrated in FIGS. 5-10, the drive system 86 provides a way to control movement of the magnet arrangement 80, and the second housing portion 68, toward the pipeline wall 74.

Figure 8:
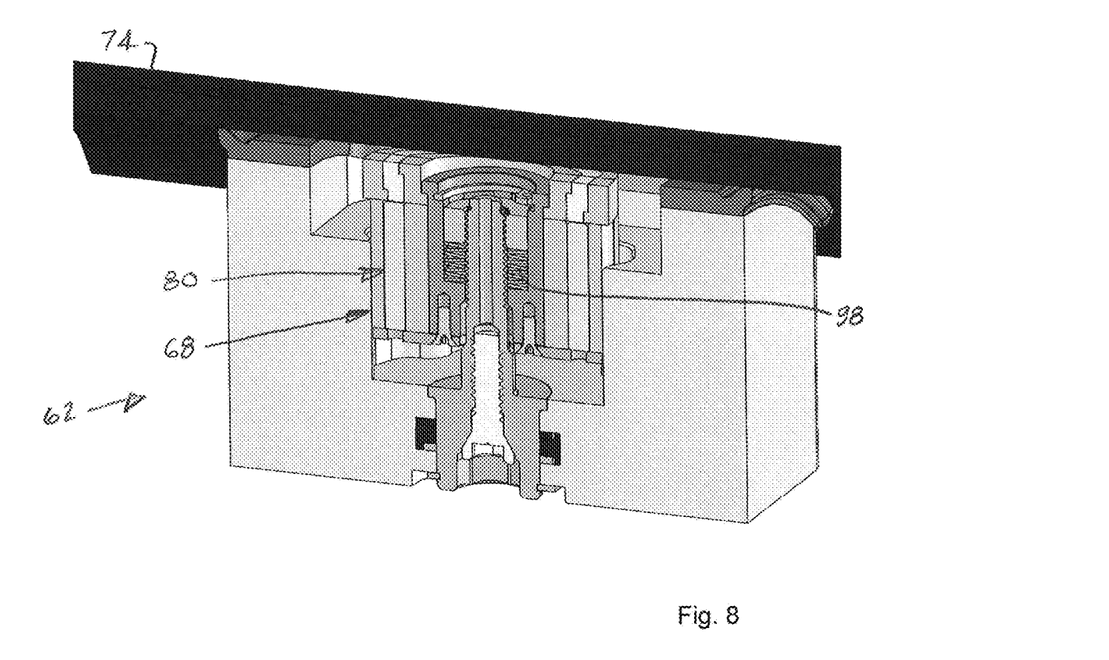
FIG. 8 shows a cross-sectional view of the system shown in FIG. 7 after magnetic attraction has begun to move the housing portion toward the pipeline wall.

FIG. 7 shows the system 62 where the drive system 86 has been actuated to move the second housing portion 68 upward—i.e., in the first direction. As shown in FIG. 7, the spring member 98 is not yet compressed and the drive nut 90 is still in contact with the retaining ring 96—see also FIG. 6 for element labels. This indicates that the magnetic attraction between the magnet arrangement 80 and the pipeline wall 74 has not yet moved the second housing arrangement 68 upward. In FIG. 8, however, the magnetic attraction between the magnet arrangement 80 and the pipeline wall 74 is strong enough that the second housing portion 68 is now moving toward the engaged position, although it is not yet in contact with the pipeline wall 74. In FIG. 8, the spring member 98 has started to compress, which indicates that it is resisting movement of the second housing portion 68 toward the pipeline wall 74. In this way, the spring member 98 acts as a damper to further control the movement of the second housing portion 68 so that there is not a damaging impact between the second housing portion 68 and the pipeline wall 74.

As described above, the system 62 uses a spring member 98 that is made up of several conical spring washers. These can be positioned so that some or all of them have the same orientation, or they can be positioned so that some or all of them have opposite or inverted orientations. In this way, the force resisting movement of the second housing portion 68 can be predetermined and adjusted based on the magnetic force generated by a magnet arrangement, such as the magnet arrangement 80. Once the resistance of the spring member 98 is overcome by the magnetic attraction between the magnet arrangement 80 and a metal structure such as the pipeline wall 74, the second housing arrangement 68, and in particular the cap 126, contacts the pipeline wall 74—see, e.g., FIG. 9.

As shown in FIG. 9, the spring member 98 is completely compressed and exerts a force upward on the drive nut 90. Because the drive nut 90 is vertically stationary because of its engagement with the threads of the drive screw 88 the attraction force between the magnet arrangement 80 and the pipeline wall 74 pulls the housing arrangement 64, and more particularly the first housing portion 66, upward and in contact with the pipeline wall 74. This provides a tight seal between the sealing member 70 and the pipeline wall 74.

The sealing force can be configured for particular applications by adjusting a number of features of the system 62. For example, the spring member 98 can be configured so that the second housing arrangement 98 contacts the pipeline wall 74 before the spring member 98 is completely compressed—this is illustrated in FIG. 10 where the spring member is identified as 98'. Alternatively, a spring member, such as the spring member 98, can be made up of conical spring washers having different spring constants, the conical spring washers can be arranged with different orientations as described above, or the spring member 98 may be made up of different types of springs or dampers, such as coil compression springs, fluid dampers, etc. The strength of the magnetic force between the magnet arrangement 80 and the pipeline wall can also be adjusted, for example, by using magnets of different strengths or modifying the metal covers, such as the covers 116, 118, to modify the concentration of the magnetic force. Thus, the embodiments described herein may be adjusted to suit the sealing requirements of many different types of applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A magnetic patch system, comprising:
   a housing arrangement including a first housing portion and a second housing portion disposed at least partially within the first housing portion;
   a magnet arrangement at least partially disposed within the housing arrangement and configured to urge the housing arrangement toward a metal structure such that the second housing portion moves from a disengaged position to an engaged position; and
   a biasing arrangement at least partially disposed within the housing arrangement, and wherein the magnet arrangement includes a plurality of magnets, each of the magnets having a respective north pole in contact with a respective first metal cover and a respective south pole in contact with a respective second metal cover such that magnetic field generated by each of the magnets is concentrated through the respective first and second metal covers.

2. The magnetic patch system of claim 1, wherein each of the magnets includes a north face corresponding to the north pole of the respective magnet and a south face corresponding to the south pole of the respective magnet, and wherein the magnets are disposed in a circumferential arrangement with one of the north face or the south face of each of the magnets facing inward toward a center of the circumferential arrangement.

3. The magnetic patch system of claim 1, wherein the magnet arrangement forms at least a part of the second housing portion.

4. The magnetic patch system of claim 1, wherein movement of the second housing portion from the disengaged position to the engaged position defines a direction of engagement, and wherein the magnet arrangement includes a plurality of magnets, each of the magnets having a first end and a second end opposite the first end defining a respective line parallel to the direction of engagement, and the magnet arrangement further includes a cap including a non-magnetic material disposed over one of the first end or the second end of each of the magnets.

5. The magnetic patch system of claim 1, wherein the biasing arrangement includes a drive system operable to move the second housing portion toward and away from the engaged position.

6. The magnetic patch system of claim 5, wherein the biasing arrangement further includes a spring member configured to resist movement of the second housing portion from the disengaged position to the engaged position.

7. The magnetic patch system of claim 1, wherein movement of the second housing portion from the disengaged position to the engaged position defines a direction of engagement, and the biasing arrangement includes a spring member configured to apply a force to the housing arrangement in the direction of engagement.

8. A magnetic patch system, comprising:
   a housing arrangement including a first housing portion and a second housing portion disposed at least partially within the first housing portion;
   a magnet arrangement at least partially disposed within the housing arrangement and configured to urge the housing arrangement toward a metal structure in the first direction; and
   a biasing arrangement at least partially disposed within the housing arrangement, and wherein the magnet arrangement includes a plurality of magnets disposed in a circumferential arrangement and each of the magnets is positioned to have one of a north pole or a south pole facing toward a center of the circumferential arrangement.

9. The magnetic patch system of claim 8, wherein the biasing arrangement includes a drive system operable to move the second housing portion between the first position and the second position.

10. The magnetic patch system of claim 9, wherein the biasing arrangement further includes a spring member configured to resist movement of the second housing portion from the first position to the second position.

11. The magnetic patch system of claim 8, wherein the biasing arrangement includes a spring member configured to apply a force to the housing arrangement in the first direction.

12. The magnetic patch system of claim 8, wherein the magnet arrangement further includes a first metal cover in contact with the magnets and positioned on an outside of the circumferential arrangement, and a second metal cover in contact with the magnets and positioned on an inside of the circumferential arrangement.

13. The magnetic patch system of claim 8, wherein each of the magnets includes a first end and a second end opposite the first end defining a respective line parallel to the first direction, and wherein the magnet arrangement further includes a cap including a non-magnetic material disposed over one of the first end or the second end of each of the magnets.

14. A magnetic patch system, comprising:
a first housing portion and a second housing portion movable relative to each other along a path;
a magnet arrangement at least partially disposed in one of the first housing portion or the second housing portion and configured to attract a metal structure along the path in a first direction; and
a biasing arrangement configured to urge one of the first housing portion or the second housing portion along the path, and wherein the biasing arrangement includes a spring member configured to apply a force to a least one of the first housing portion or the second housing portion in the first direction.

15. The magnetic patch system of claim 14, wherein the biasing arrangement includes a drive system operable to move the second housing portion relative to the first housing portion in the first direction and along the path in a second direction opposite the first direction.

16. The magnetic patch system of claim 14, wherein the biasing arrangement further includes a spring member configured to oppose movement of the second housing portion in the first direction.

17. The magnetic patch system of claim 14, wherein the magnet arrangement includes a plurality of magnets, each of the magnets having a first end and a second end opposite the first end defining a respective line parallel to the path, and the magnet arrangement further includes a cap including a non-magnetic material disposed over one of the first end or the second end of each of the magnets.

* * * * *